Figure 1:
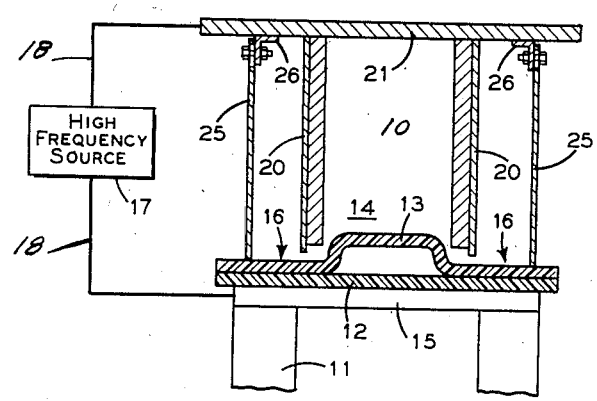

Feb. 4, 1958  M. ROTHSTEIN ET AL  2,822,454
HEAT SEALING APPARATUS
Filed June 14, 1956

INVENTORS
Milton Rothstein
Martin Kaplan
BY
ATTORNEY

United States Patent Office 2,822,454
Patented Feb. 4, 1958

2,822,454

HEAT SEALING APPARATUS

Milton Rothstein, Flushing, and Martin Kaplan, Bellerose, N. Y., assignors to Radio Receptor Company, Inc., Brooklyn, N. Y., a corporation of New York Application June 14, 1956, Serial No. 591,318

5 Claims. (Cl. 219—10.53)

This invention relates to high frequency electric heating apparatus and, more particularly, to improved apparatus of this type as used for the heat sealing or embossing of relatively thin thermoplastic material.

In the heat sealing or embossing of this material, seam forming or pattern electrodes are engaged with one surface of the work, such as a pair of thermoplastic material sheets, and press the work against cooperating backing or support electrode means. A source of high frequency electric energy is connected to the electrodes to produce a high frequency heating field in the dielectric workpieces therebetween. Pressure is applied to the electrodes to compress or deform the material at the seam or pattern.

As the material is thinned by the electrode pressure during such sealing, there is likelihood of arcing between the electrodes due to breakdown of the material, particularly when the latter is in the nature of relatively thin sheets or strips. This arcing causes pitting of the electrode contact or work engaging surfaces necessitating re-grinding thereof. Frequent re-grinding of the electrode surfaces is undesirable as it adds to the manufacturing expense of the articles.

In accordance with the present invention, such arcing at the seaming or pattern electrodes is avoided by utilizing a replaceable auxiliary electrode engaging the work in a "waste" area outside the desired pattern. This auxiliary electrode is caused to engage the work with a greater mechanical pressure than do the main electrodes, thus thinning or compressing the waste or discard area of the work to a greater extent than the main electrodes thin the work in making the seam or pattern. Consequently, any breakdown in the work will occur at the auxiliary electrode due to the shorter arc gap thereat. As this electrode is not only replaceable but also need not be dressed, arcing thereat is unimportant, and puncturing or spoiling of the work at the auxiliary electrode is also unimportant as this is waste or trim material.

More specifically, the auxiliary electrode is mounted adjustably relative to the main electrodes so as to project a pre-set distance therebeyond. Thereby, when the electrodes are clamped to the work under pressure, the auxiliary electrode engages the work before the main electrodes do and compresses the work to a greater extent when the main electrodes are pressed against the work.

Figure 2:
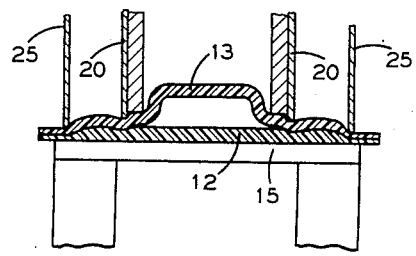

For an understanding of the invention principles, reference is made to the following description of a typical embodiment thereof as illustrated in the accompanying drawing. In the drawing:

Figs. 1 and 2 are elevation views of high frequency heat sealing or embossing electrode assemblies incorporating the invention, two positions thereof being illustrated.

Referring to the drawing, a high frequency electric heating apparatus 10 is illustrated as comprising a suitable work supporting structure 11 on which is a backing electrode 15. The workpieces, which may comprise relatively thin sheets 12, 13 of dielectric material, are positioned on electrode 15 for engagement by seam sealing or pattern embossing electrodes 20 supported from a conductor 21.

The useful area of work 12, 13 is that confined within electrodes 20, as indicated at 14, and the area 16 outside these electrodes is waste area intended to be trimmed after the seal is formed or the patterns embossed.

To form the seal or pattern, electrodes 20 are pressed against work 12, 13 to compress and thin the same, and a high frequency heating field is developed by virtue of a high frequency service of electric energy 17 connected by conductors 18 to electrode 15 and electrode 20.

As material 12, 13 is compressed and heated, it sometimes breaks down causing arcing between electrodes 15 and 20. This arcing pits the electrode work-contacting surfaces necessitating re-dressing thereof to avoid marring the workpieces, this dressing representing an expense item in the manufacturing process.

In accordance with the present invention, arcing between electrodes 15 and 20 is prevented by means of auxiliary electrode or electrodes 25 adjustably supported from conductor or plate 21 by means of conductive brackets 26. Electrodes 25 are adjusted so that their contact ends project a short distance beyond electrodes 20, electrodes 25 being outside electrodes 20 so as to engage the waste area 16 of work 12, 13. Thus, when the electrode structure is moved toward work 12, 13, replaceable electrodes 25 engage the work before electrodes 20. As the electrodes 20 are pressed against the work, electrodes 25 compress and thin the waste area 16 to a greater extent than electrodes 20 compress the seam or pattern area.

The waste area engaged by the electrodes 25 is thus thinned to a greater extent than is the seam or pattern area. Consequently any breakdown in the work, when the high frequency field is applied, will occur at electrodes 25 and not at electrodes 20. Arcing at electrodes 25 is not important as these are replaceable electrodes engaged with waste areas of the work, and thus need not be dressed when pitted by arcing. The amount of projection of electrodes 25 beyond electrodes 20 may be adjusted as necessary or desirable in accordance with work characteristics or operating conditions.

While a specific embodiment of the invention has been shown and described in detail to illustrate the application of the invention principles, it will be understood that the invention may be embodied otherwise without departing from such principles.

We claim:

1. Apparatus for treating relatively thin sheets of dielectric material by the application of pressure and a high frequency electric heating field thereto, said apparatus comprising, in combination, first electrode means arranged to have the work supported thereon; second electrode means movable toward said first electrode means to engage and compress the work thereagainst; a source of high frequency electric potential having opposite polarity terminals connected to said electrode means to produce a high frequency electric heating field in the work compressed therebetween; the zone of engagement of said second electrode means with the work defining a useable portion of the work, the work outside said zone constituting a waste portion designed to be severed from such useable portion; and auxiliary electrode means mounted for movement with said second electrode means to engage the waste portion of said work in substantially spaced relation to the zones of engagement of said second electrode means; said auxiliary and second electrode means being connected to the same terminal of said source; said auxiliary electrode means projecting beyond said second electrode means whereby, when the work is engaged and compressed, said auxiliary electrode means will deform and thin the work to a greater extent than the second electrode means so that any potential breakdown and arcing through the work will occur at said auxiliary electrode means and in such waste portion.

2. Apparatus for treating relatively thin sheets of dielectric material by the application of pressure and a high frequency electric heating field thereto, said apparatus comprising, in combination, first electrode means arranged to have the work supported thereon; second electrode means movable toward said first electrode means to engage and compress the work thereagainst; a source of high frequency electric potential having opposite polarity terminals connected to said electrode means to produce a high frequency electric heating field in the work compressed therebetween; the zone of engagement of said second electrode means with the work defining a useable portion of the work, the work outside said zone constituting a waste portion designed to be severed from such useable portion; and auxiliary electrode means mounted for movement with said second electrode means to engage the waste portion of said work in substantially spaced relation to the zones of engagement of said second electrode means; said auxiliary and second electrode means being connected to the same terminal of said source; said auxiliary electrode means projecting beyond said second electrode means whereby, when the work is engaged and compressed, said auxiliary electrode means will deform and thin the work to a greater extent than the second electrode means so that any potential breakdown and arcing through the work will occur at said auxiliary electrode means and in such waste portion.

3. Apparatus for treating relatively thin sheets of dielectric material by the application of pressure and a high frequency electric heating field thereto, said apparatus comprising, in combination, first electrode means arranged to have the work supported thereon; second electrode means movable toward said first electrode means to engage and compress the work thereagainst; a source of high frequency electric potential having opposite polarity terminals connected to said electrode means to produce a high frequency electric heating field in the work compressed therebetween; the zone of engagement of said second electrode means with the work defining a useable portion of the work, the work outside said zone constituting a waste portion designed to be severed from such useable portion; auxiliary electrode means mounted for movement as a unit with said second electrode means to engage the waste portion of said work in substantially spaced relation to the zones of engagement of said second electrode means; said auxiliary and second electrode means being connected to the same terminal of said source; said auxiliary electrode means projecting a pre-set short distance beyond said second electrode means whereby, when the work is engaged and compressed, said auxiliary electrode means will deform and thin the work to a greater extent than the second electrode means so that any potential breakdown and arcing through the work will occur at said auxiliary electrode means and in such waste portion.

4. Apparatus as claimed in claim 3 in which said auxiliary electrode means is adjustable relative to said second electrode means to pre-set the projection of said auxiliary electrode means.

5. Apparatus as claimed in claim 3 in which said auxiliary and second electrode means are mounted on a common support, and said auxiliary electrode means is adjustable relative to said second electrode means to pre-set the projection of said auxiliary electrode means.

References Cited in the file of this patent

UNITED STATES PATENTS

| 2,631,646 | Gannon et al. | Mar. 17, 1953 |
| 2,632,724 | Lumbard | Mar. 24, 1953 |
| 2,686,556 | Gerber et al. | Aug. 17, 1954 |

FOREIGN PATENTS

| 119,013 | Australia | Oct. 12, 1944 |